United States Patent
Mino et al.

(10) Patent No.: US 8,353,098 B2
(45) Date of Patent: Jan. 15, 2013

(54) METHOD OF MANUFACTURING PERPENDICULAR MAGNETIC WRITE HEAD

(75) Inventors: Tetsuya Mino, Hong Kong (CN); Naoto Matono, Hong Kong (CN); Ikuhito Onodera, Hong Kong (CN); Kazushi Nishiyama, Hong Kong (CN); Michitoshi Tsuchiya, Hong Kong (CN); Kenji Sasaki, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 384 days.

(21) Appl. No.: 12/659,582

(22) Filed: Mar. 12, 2010

(65) Prior Publication Data

US 2011/0220611 A1    Sep. 15, 2011

(51) Int. Cl.
*G11B 5/127* (2006.01)
*H04R 31/00* (2006.01)

(52) U.S. Cl. ............... 29/603.14; 29/603.12; 29/603.13; 29/603.15; 29/603.16; 29/603.18; 216/62; 216/65; 216/66; 360/125.12; 360/125.5; 360/125.51; 360/317; 360/318; 451/5; 451/41

(58) Field of Classification Search ............... 29/603.07, 29/603.13–603.16, 603.1; 216/22; 360/125.12, 360/125.5, 125.51, 317, 318; 427/127–131
See application file for complete search history.

(56) References Cited

U.S. PATENT DOCUMENTS

| | | | |
|---|---|---|---|
| 6,775,099 B2 | 8/2004 | Kuroda et al. | |
| 7,006,326 B2 * | 2/2006 | Okada et al. | 360/125.13 |
| 7,133,252 B2 * | 11/2006 | Takano et al. | 360/125.13 |
| 7,443,633 B2 * | 10/2008 | Tagami et al. | 360/125.5 |
| 2011/0011744 A1 * | 1/2011 | Chen et al. | 205/85 |
| 2011/0094888 A1 * | 4/2011 | Chen et al. | 205/81 |

FOREIGN PATENT DOCUMENTS

| | | |
|---|---|---|
| JP | 2003-036503 | 2/2003 |
| JP | 2004-342210 | 12/2004 |
| JP | 2006-252620 | 9/2006 |

* cited by examiner

*Primary Examiner* — Paul D Kim
(74) *Attorney, Agent, or Firm* — Nixon & Vanderhye PC

(57) ABSTRACT

A method of manufacturing a perpendicular magnetic recording head capable of easily and accurately forming a main magnetic-pole layer having a shape suitable for concentrating a magnetic flux is provided. A nonmagnetic layer having a recessed section (a first recessed section and a second recessed section) is formed, and then an additional nonmagnetic layer is formed on an inner surface of the recessed section. Then, a magnetic layer is formed in the recessed section formed with the additional nonmagnetic layer, and then the magnetic layer is cut to form an air bearing surface, so as to form the main magnetic-pole layer.

5 Claims, 13 Drawing Sheets

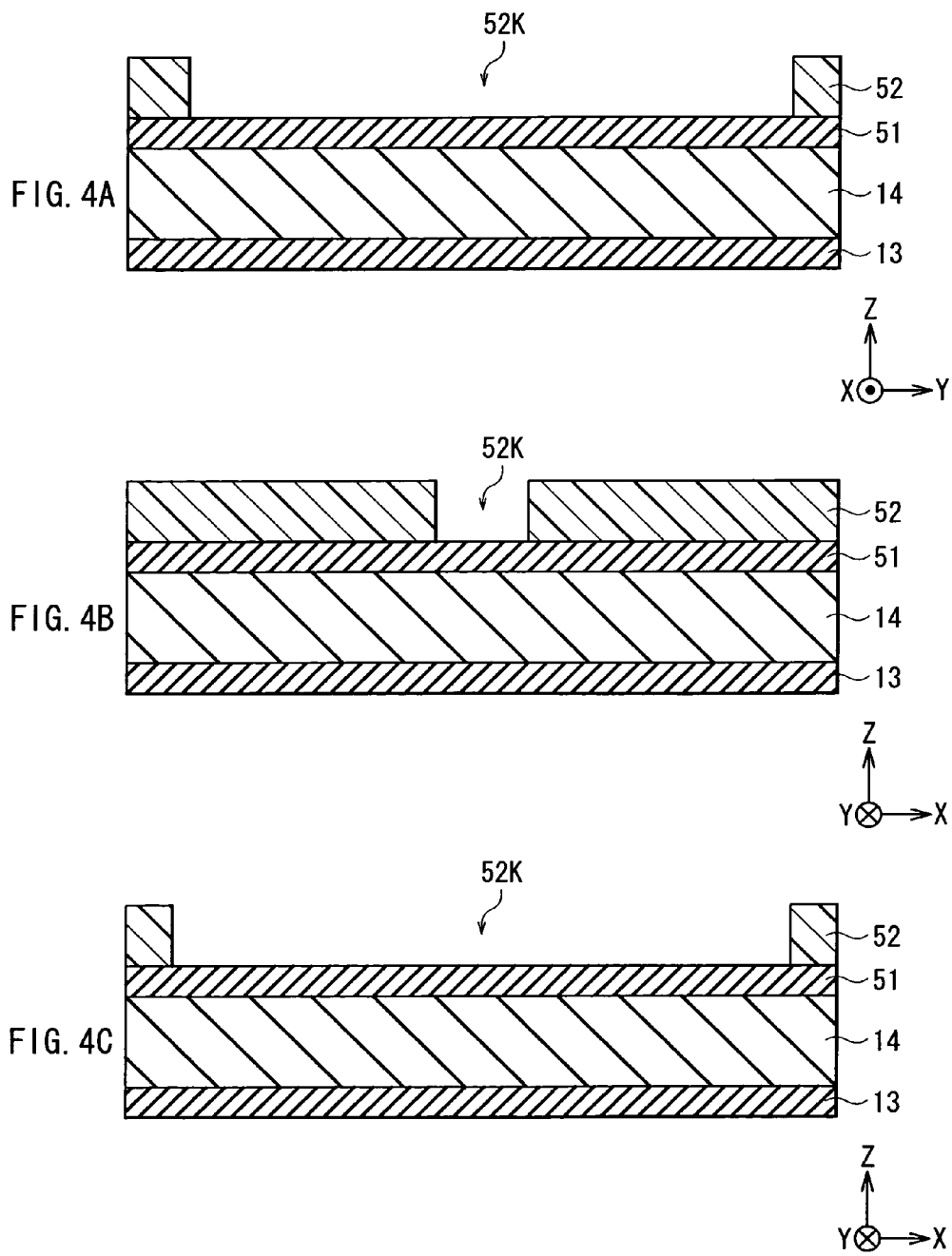

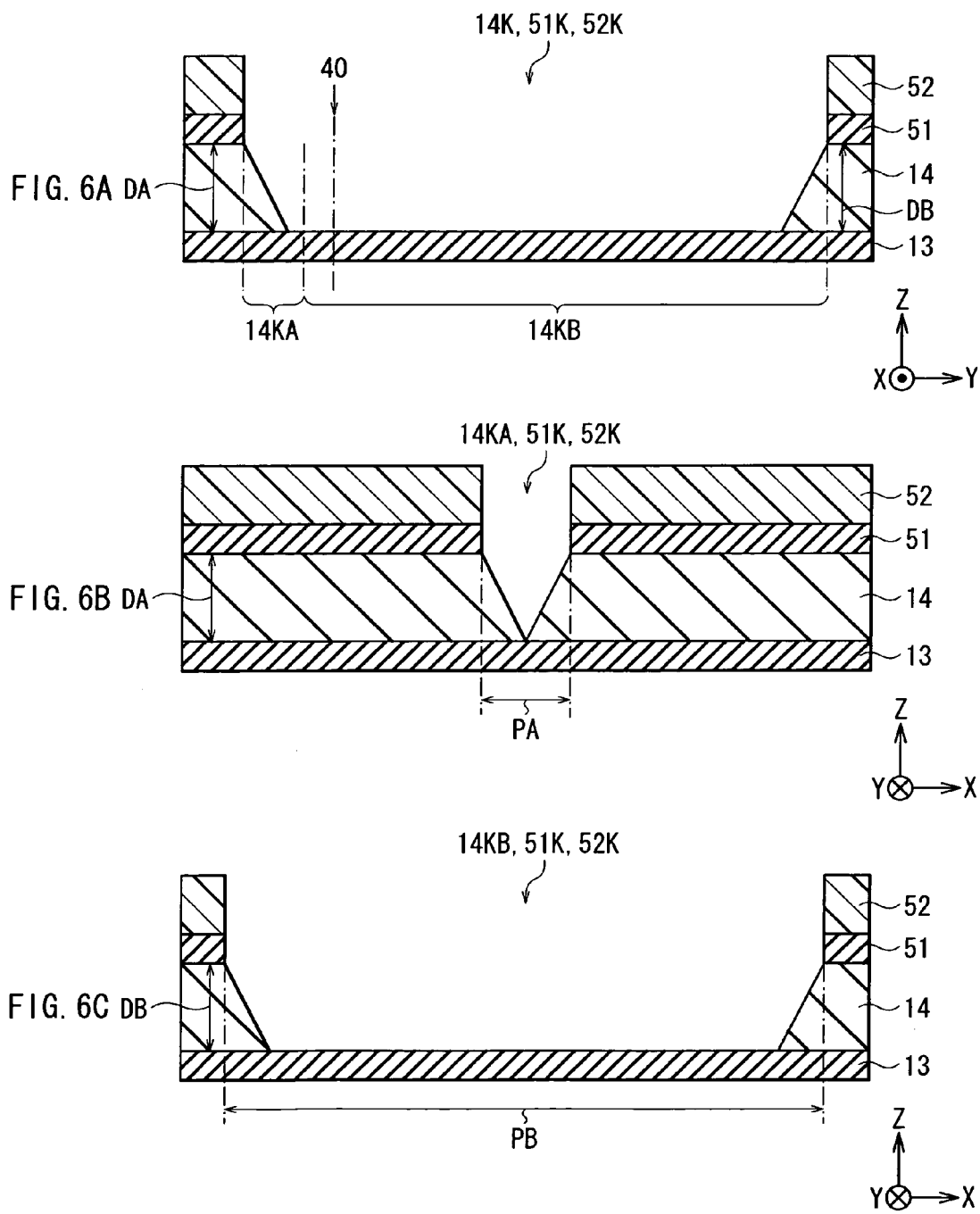

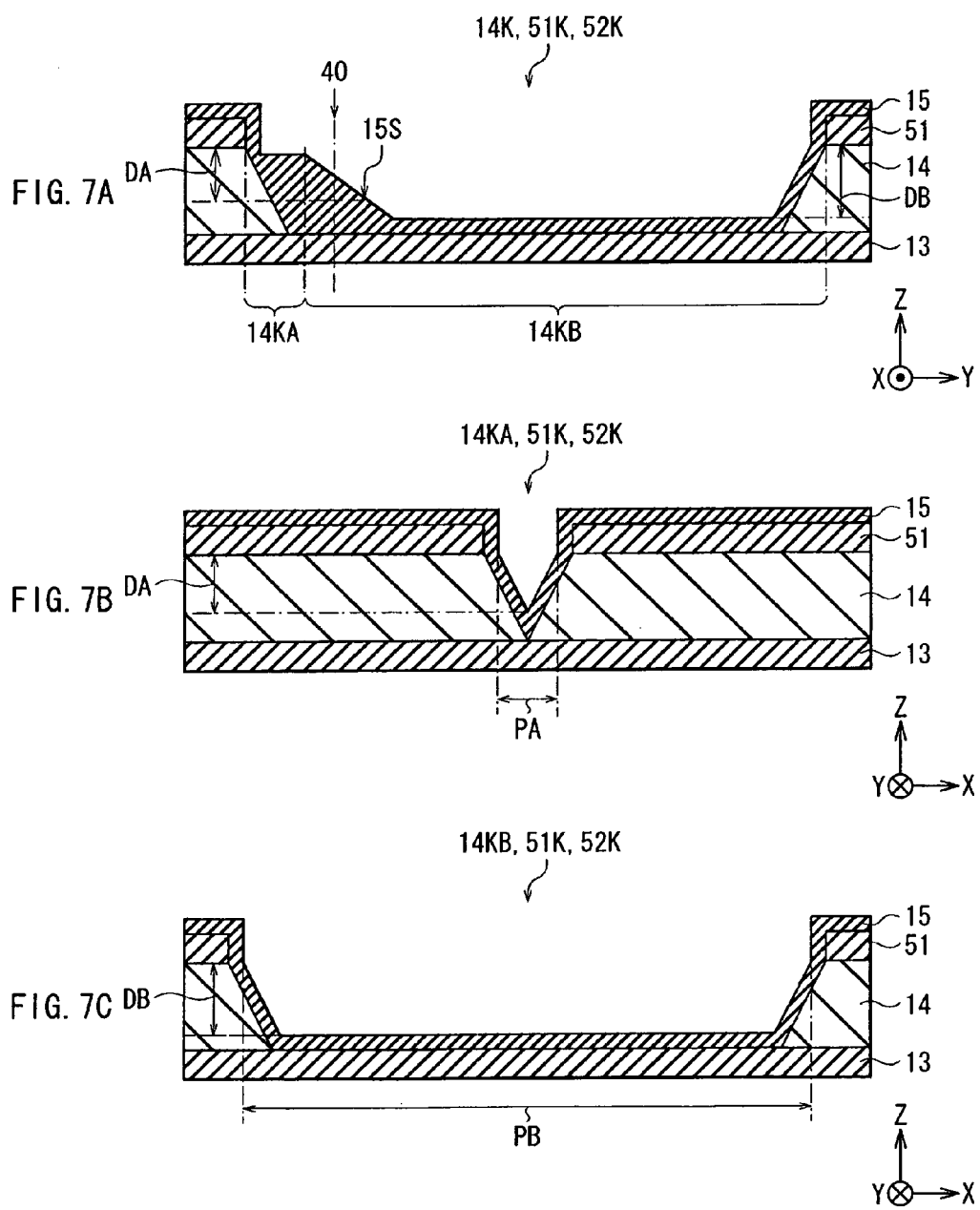

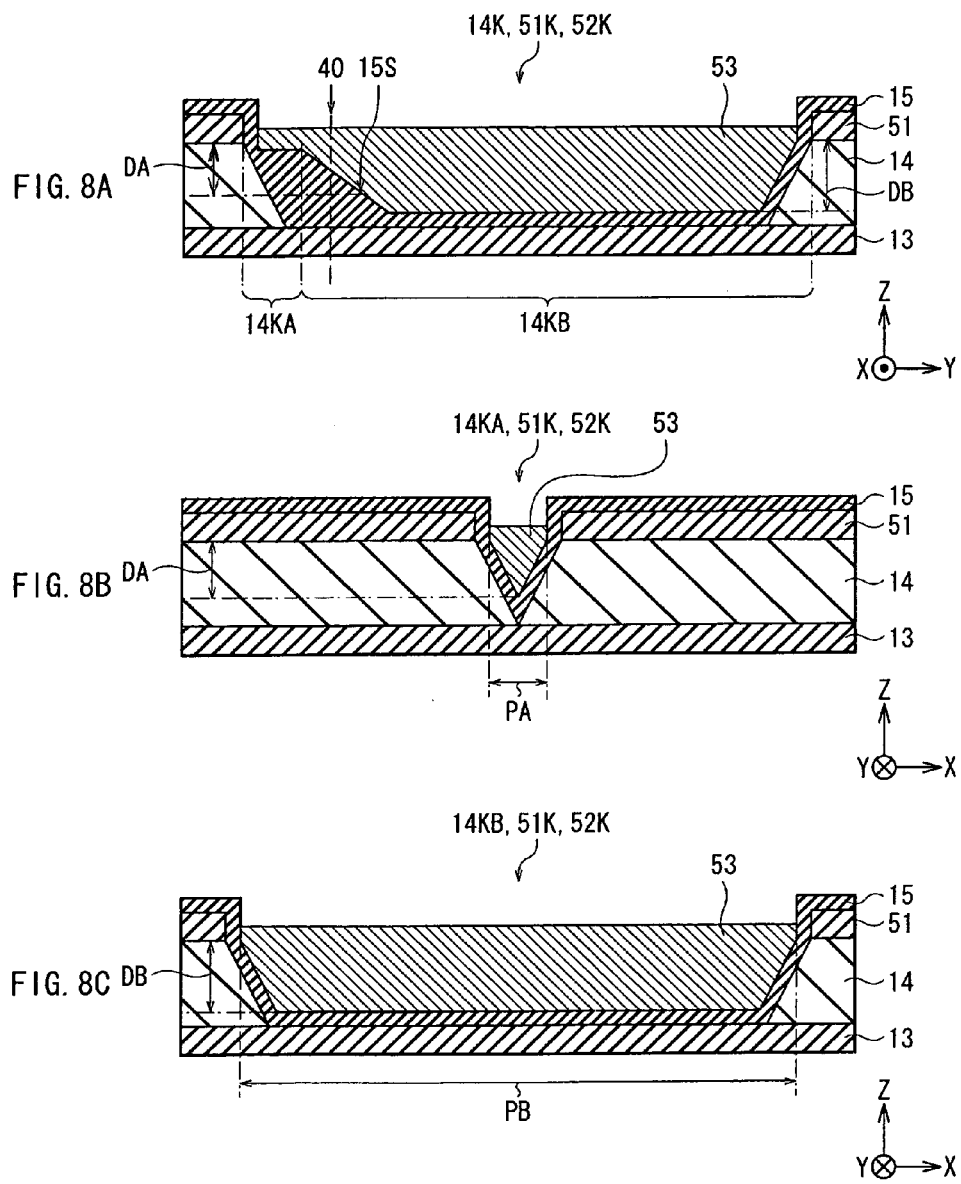

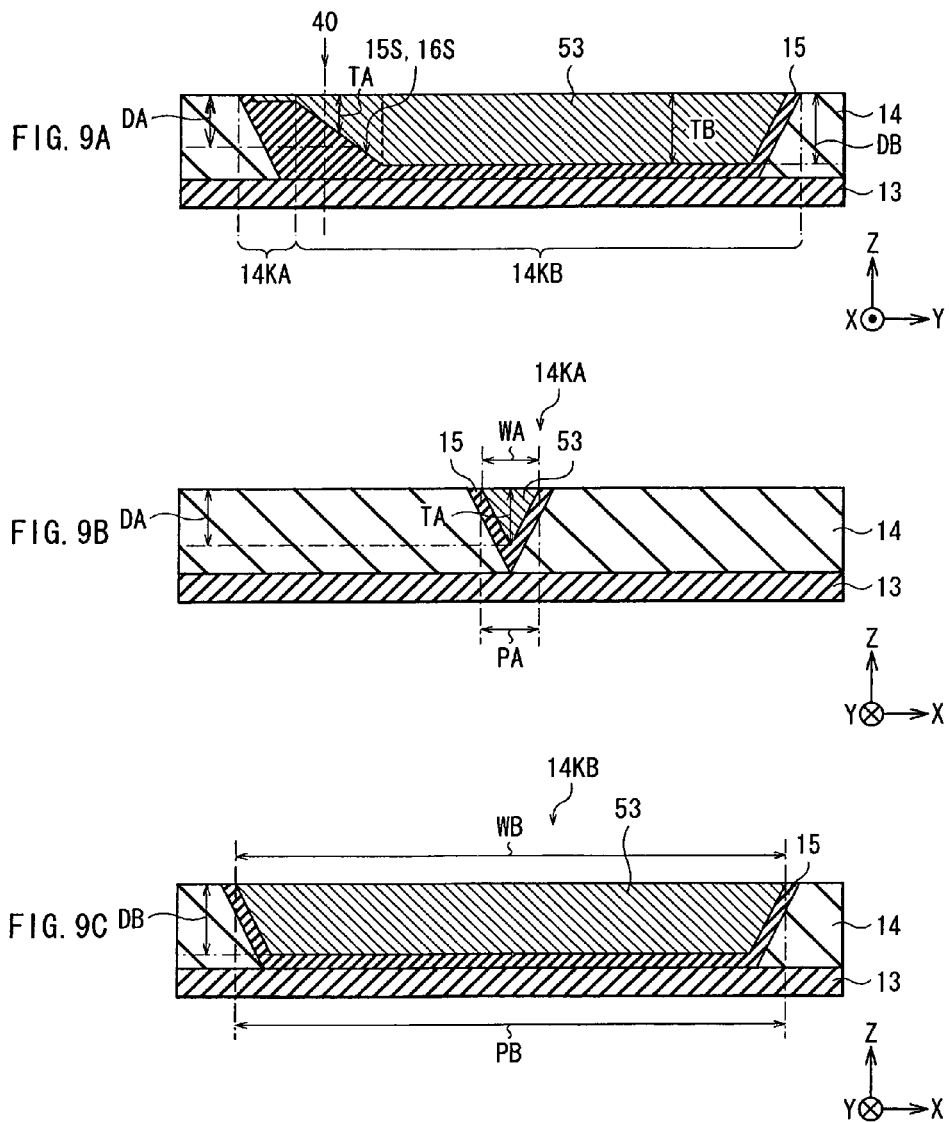

METHOD OF MANUFACTURING PERPENDICULAR MAGNETIC WRITE HEAD

BACKGROUND OF THE INVENTION

1. Field of the Invention

The present invention relates to a method of manufacturing a perpendicular magnetic recording head provided with a main magnetic-pole layer.

2. Description of the Related Art

In recent years, a development of a perpendicular magnetic recording head is in progress, due to a drastic increase in an areal recording density of a magnetic recording medium (hereinafter, referred to as "recording medium") typified by a hard disk. The reason is that there are such advantages, as compared with a longitudinal magnetic recording head, that a linear recording density improves, and a recording medium on which information has been already recorded is less susceptible to thermal fluctuation.

The perpendicular magnetic recording head is provided with a thin-film coil for generating a magnetic flux, and a main magnetic-pole layer which leads the magnetic flux generated in the thin-film coil to the recording medium. Various discussions have been made for a shape of the main magnetic-pole layer, in order to improve recording performance.

Specifically, the main magnetic-pole layer is provided with a tapered section, such that a width or a thickness gradually decreases as approaching an air bearing surface, as disclosed in Japanese Unexamined Patent Application Publication Nos. 2003-036503, 2004-342210, and 2006-252620, and in U.S. Pat. No. 6,775,099, for example.

SUMMARY OF THE INVENTION

In a perpendicular magnetic recording head, writing is substantially performed in a trailing edge of a main magnetic-pole layer on an air bearing surface. Thus, a shape having a tapered section, or a shape having a tapered section in a thickness direction in particular, is suitable as a shape for concentrating a magnetic flux on the trailing edge.

However, a formation of the main magnetic-pole layer having the tapered section in the thickness direction requires cumbersome and difficult operations, and it cannot be said that the precision of formation thereof is sufficient as well. This is because, since it is difficult to form the main magnetic-pole layer substantially by one process (only by a deposition process of a magnetic material), it is necessary to perform a post-processing operation after forming the main magnetic-pole layer having a constant thickness (such as forming the tapered section by etching or the like), or to dividedly form the main magnetic-pole layer (i.e., separately forming a section having the tapered section and a section having no tapered section). Also, it is because, since a variation is likely to occur in precision following the post-processing operation (an amount of etching or the like), it is difficult to repeatedly reproduce a predetermined shape.

Incidentally, to form the main magnetic-pole layer having the tapered section in the thickness direction, a method may be contemplated, which forms the tapered section on an underlayer and then forms the main magnetic-pole layer on the underlayer, as disclosed in Japanese Unexamined Patent Application Publication No. 2006-252620. However, when attempting to form a photoresist pattern on the underlayer having the tapered section by using a photolithography method, an exposure region of a photoresist film is likely to be expanded or reduced unintentionally by an influence of light reflected obliquely from the tapered section. Thus, precision of formation of the photoresist pattern becomes insufficient.

It is therefore desirable to provide a method of manufacturing a perpendicular magnetic recording head, capable of forming a main magnetic-pole layer, having a shape suitable for concentrating a magnetic flux, easily and accurately.

A method of manufacturing a perpendicular magnetic recording head according to an embodiment of the present invention performs the following processes (1) to (4).

(1) Forming a nonmagnetic layer having a first recessed section and a second recessed section coupled with a rear part thereof. In this case, in the first recessed section, a width in a length direction going rearward from an air bearing surface is made constant, and a width in a depth direction going toward a leading side from a trailing side is made gradually narrower. Also, in the second recessed section, a width in the length direction is made gradually wider, and a width in the depth direction is made gradually narrower.

(2) Forming an additional nonmagnetic layer on an inner surface of the first and the second recessed sections.

(3) Forming a magnetic layer in the first and the second recessed sections which are formed with the additional nonmagnetic layer.

(4) Forming a main magnetic-pole layer by cutting the magnetic layer and thereby forming the air bearing surface.

According to the method of manufacturing the perpendicular magnetic recording head, the above processes (1) to (4) are performed. Thus, the main magnetic-pole layer having the air bearing surface in the first and the second recessed sections, which are formed with the nonmagnetic layer, is formed. Thereby, by utilizing a difference in deposition tendency of the additional nonmagnetic layer between the first recessed section and the second recessed section, the depth of the first and the second recessed sections becomes shallower in a front part (on the first recessed section side) than a rear part (on the second recessed section side), and the depth becomes gradually shallower as approaching the front part from the rear part in a halfway part thereof. Therefore, since a shape of the main magnetic-pole layer is determined, reflecting a change in the depth of the first and the second recessed sections described above, it is possible to form the main magnetic-pole layer having the shape suitable for concentrating a magnetic flux (a tapered section in a thickness direction), easily and accurately.

BRIEF DESCRIPTION OF THE DRAWINGS

FIG. 4A, FIG. 4B, and FIG. 4C are cross-sectional views for describing a manufacturing method of a main part of the thin-film magnetic head.

FIG. 6A, FIG. 6B, and FIG. 6C are cross-sectional views for describing a process subsequent to that of FIG. 5A, FIG. 5B, and FIG. 5C.

FIG. 7A, FIG. 7B, and FIG. 7C are cross-sectional views for describing a process subsequent to that of FIG. 6A, FIG. 6B, and FIG. 6C.

FIG. 8A, FIG. 8B, and FIG. 8C are cross-sectional views for describing a process subsequent to that of FIG. 7A, FIG. 7B, and FIG. 7C.

FIG. 9A, FIG. 9B, and FIG. 9C are cross-sectional views for describing a process subsequent to that of FIG. 8A, FIG. 8B, and FIG. 8C.

DETAILED DESCRIPTION OF THE PREFERRED EMBODIMENTS

In the following, an embodiment of the present invention will be described in detail with reference to the accompanying drawings.

Figures 1A, 1B:
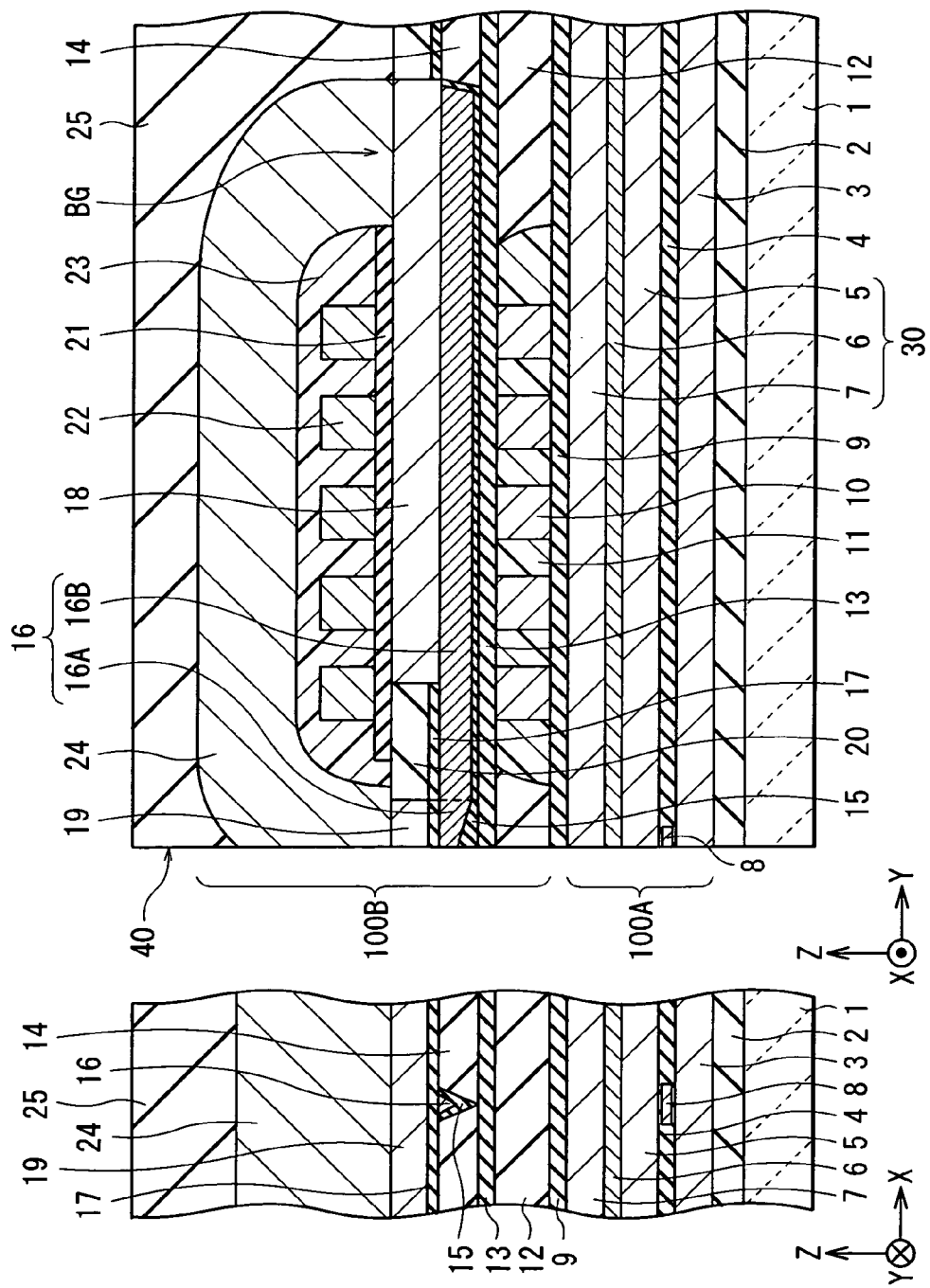
FIG. 1A and FIG. 1B are cross-sectional views each illustrating a configuration of a thin-film magnetic head provided with a perpendicular magnetic recording head according to an embodiment of the present invention.

First, a configuration of a thin-film magnetic head provided with a perpendicular magnetic recording head according to one embodiment of the present invention will be described. FIG. 1A illustrates a cross-sectional configuration which is parallel to an air bearing surface 40 of the thin-film magnetic head, and FIG. 1B illustrates a cross-sectional configuration which is perpendicular to the air bearing surface 40 of the thin-film magnetic head.

In the description below, the dimensions in the X-axis direction, the Y-axis direction, and the Z-axis direction, all of which being indicated in FIGS. 1A and 1B, are referred to as "width", "length", and "thickness or depth", respectively. The side close to the air bearing surface 40 in the Y-axis direction is referred to as "front", whereas the side away from the air bearing surface 40 in the Y-axis direction is referred to as "rear". Further, if a state of a recording medium (not illustrated) which makes a relative movement with respect to the thin-film magnetic head is regarded as a stream, a side ahead of (upper side of) the stream is referred to as a "trailing side", and a side behind (lower side of) the stream is referred to as a "leading side". These definitions are also applicable to FIG. 2 and the figures subsequent to FIG. 2, all of which will be described later.

The thin-film magnetic head described here is, for example, a composite head capable of performing both reading processing and recording processing.

The thin-film magnetic head has, for example, a configuration in which an insulating layer 2, a reading head section 100A executing the reading processing by utilizing an MR effect (MR: magneto-resistive effect), a separating layer 9, a recording head section 100B executing the recording processing of a perpendicular magnetic write type, and an overcoat layer 25, are stacked in this order on a substrate 1. The substrate 1 is formed by a ceramic material such as AlTiC ($Al_2O_3 \cdot TiC$), for example. The insulating layer 2, the separating layer 9, and the overcoat layer 25 are formed by a nonmagnetic insulating material such as aluminum oxide ($Al_2O_3$: hereinafter referred to as "alumina"), for example.

The reading head section 100A has, for example, a configuration in which a bottom lead shield layer 3, a shielding gap film 4, and a top lead shield layer 30 are stacked in this order. In the shielding gap film 4, a reading element (MR element 8) is buried such that one end thereof is exposed on the air bearing surface 40.

The bottom lead shield layer 3 is formed by a magnetic material such as an alloy of nickel and iron (NiFe), for example. The nickel-iron alloy is, for example, Permalloy (trade name) in which the content of nickel and the content of iron are 80 weight % and 20 weight %, respectively. The upper read shield layer 30 has a configuration in which magnetic layers 5 and 7 are stacked with a nonmagnetic layer 6 in between. Each of the magnetic layers 5 and 7 is formed by a magnetic material such as Permalloy, for example. The nonmagnetic layer 6 is formed by a nonmagnetic conductive material such as ruthenium (Ru), or is formed by a nonmagnetic insulating material such as alumina, for example.

The shielding gap film 4 is formed by a nonmagnetic insulating material such as alumina, for example. The MR element 8 utilizes a giant magnetoresistive effect (GMR: giant magneto-resistive effect), a tunneling magnetoresistive effect (TMR: tunneling magneto-resistive effect), or the like.

The recording head section 100B has, for example, a configuration in which a thin-film coil 10 embedded in coil insulating layers 11 and 12, a main magnetic-pole layer 16 of which periphery is embedded with nonmagnetic layers 13 and 14 and with an additional nonmagnetic layer 15, a gap layer 17, an auxiliary magnetic-pole layer 18, a write shield layer 19, an embedded insulating layer 20, a thin-film coil 22 embedded in coil insulating layers 21 and 23, and a return yoke layer 24 are stacked in this order.

The thin-film coil 10 is formed by a highly-conductive metal material such as copper (Cu) for example, and has a spiral structure in which the thin-film coil 10 is wound about a back gap BG.

The coil insulating layer 11 is formed by a nonmagnetic insulating material such as a photoresist or a spin-on-glass (SOG: Spin On Glass) which exhibits fluidity at the time of heating, for example. The coil insulating layer 12 is formed by a nonmagnetic insulating material such as alumina, for example.

Each of the nonmagnetic layers 13 and 14, and the additional nonmagnetic layer 15 is formed by a nonmagnetic insulating material such as alumina, for example. As will be described later, each of the nonmagnetic layers 13 and 14 is used as a frame mold (frame) for forming the main magnetic-pole layer 16 in a manufacturing process of the thin-film magnetic head.

The main magnetic-pole layer 16 leads a magnetic flux generated mainly in the thin-film coil 22 to the recording medium, and extends in a length direction (Y-axis direction=a direction going rearward from the air bearing surface 40). The main magnetic-pole layer 16 is formed by a high-saturation magnetic flux density magnetic material such as an iron-based alloy, for example. The iron-based alloy is, for example, an alloy of iron and cobalt (FeCo), or an alloy of iron, cobalt, and nickel (FeCoNi).

Also, the main magnetic-pole layer 16 includes a magnetic pole-tip section 16A and a yoke section 16B in order from the air bearing surface 40. The magnetic pole-tip section 16A is a tip section which substantially generates a perpendicular magnetic field. The yoke section 16B is a rearward section which supplies the magnetic flux to the magnetic pole-tip section 16A, and is coupled with the magnetic pole-tip section 16A. A detailed configuration of the main magnetic-pole layer 16 will be described later (with reference to FIGS. 2 and 3).

The gap layer 17 is a so-called write gap, and is formed by a nonmagnetic insulating material such as alumina, for example.

The auxiliary magnetic-pole layer 18 is formed by a magnetic material similar to that of the main magnetic-pole layer 16, for example. The auxiliary magnetic-pole layer 18 extends in the length direction from a position recessed from the air bearing surface 40 on the trailing side of the main magnetic-pole layer 16, and is coupled to the main magnetic-pole layer 16.

The write shield layer 19 extends in the length direction from the air bearing surface 40 on the trailing side of the main magnetic-pole layer 16 while neighboring the gap layer 17, and is configured of a magnetic material which is similar to that of the main magnetic-pole layer 16, for example.

The embedded insulating layer 20 is filled between the auxiliary magnetic-pole layer 18 and the write shield layer 19, and is formed by a nonmagnetic insulating material such as alumina, for example.

A forming material and a configuration of the thin-film coil 22 are similar to those of the thin-film coil 10, for example.

Each of the coil insulating layers 21 and 23 is formed by a nonmagnetic insulating material which is similar to that of the coil insulating layers 12 and 11, for example. The coil insulating layers 21 and 23 are coupled to the embedded insulating layer 20, for example, and forefront ends of the coil insulating layers 21 and 23 are recessed from a forefront end of the embedded insulating layer 20.

The return yoke layer 24 extends in the length direction from the air bearing surface 40 on the trailing side of the auxiliary magnetic-pole layer 18 and the write shield layer 19, and is coupled to the write shield layer 19 at a front part thereof while coupled to the auxiliary magnetic-pole layer 18 at a rear part (the back-gap BG) thereof. The return yoke layer 24 is formed by a magnetic material which is similar to that of the main magnetic-pole layer 16, for example.

Figure 2:
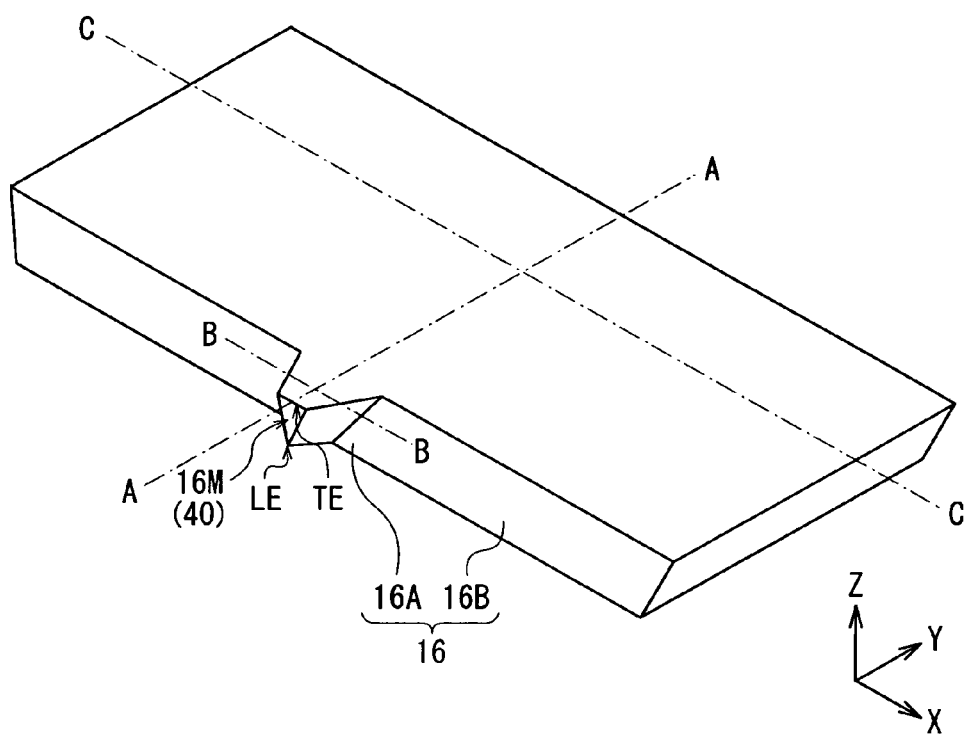
FIG. 2 is a perspective view illustrating a configuration of a main magnetic-pole layer illustrated in FIG. 1.
Figure 3A:
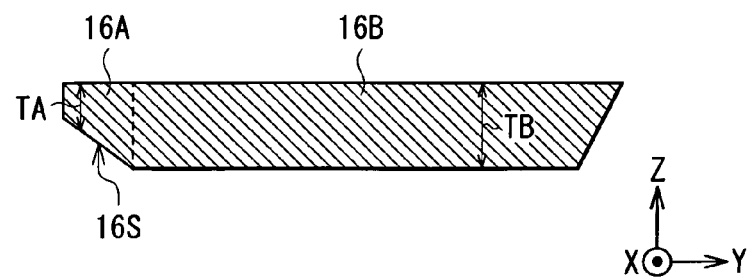
FIG. 3A, FIG. 3B, and FIG. 3C are cross-sectional views of the main magnetic-pole layer taken along lines A-A, B-B, and C-C illustrated in FIG. 2, respectively.
Figure 3B:
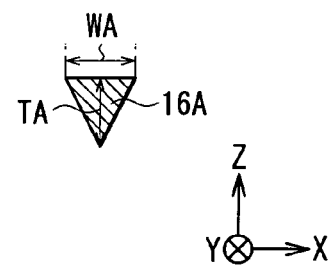
Figure 3C:
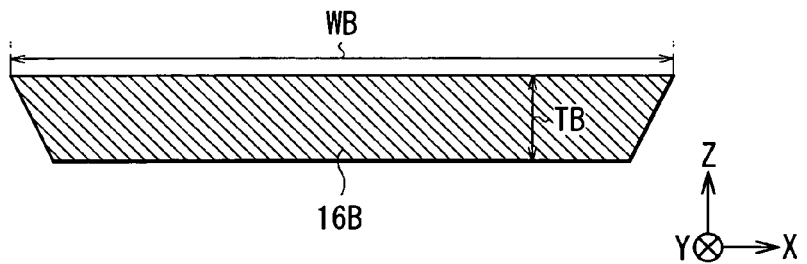

Next, the detailed configuration of the main magnetic-pole layer 16 will be described. FIG. 2 illustrates a perspective configuration of the main magnetic-pole layer 16. FIG. 3A, FIG. 3B, and FIG. 3C illustrate cross-sectional configurations taken along lines A-A, B-B, and C-C illustrated in FIG. 2, respectively.

The main magnetic-pole layer 16 has a configuration in which the yoke section 16B is coupled with a rear part of the magnetic pole-tip section 16A, and in which the magnetic pole-tip section 16A and the yoke section 16B are integrated (integral formation). As used herein, the term "integrated" means that there is no joint surface between the magnetic pole-tip section 16A and the yoke section 16B, and that they cannot be separated unless the main magnetic-pole layer 16 is broken. Incidentally, a dashed line is provided at a boundary between the magnetic pole-tip section 16A and the yoke section 16B in FIGS. 1A and 3A.

The magnetic pole-tip section 16A includes a section in which a width and a thickness gradually decrease as approaching the air bearing surface 40. Since a flow path of the magnetic flux gradually narrows, the magnetic flux flowing in the flow path is concentrated toward the air bearing surface 40.

Specifically, a shape of the magnetic pole-tip section 16A (a width WA and a thickness TA) is as follows. The width WA gradually widens in the length direction, and gradually narrows in a thickness direction (Z-axis direction=a direction going from the trailing side to the leading side). The thickness TA gradually increases in the thickness direction, in the length direction (as going toward the leading side). Thus, the magnetic pole-tip section 16A has an inclined surface 16S, and the magnetic pole-tip section 16A is provided with a tapered section.

The magnetic pole-tip section 16A has an end surface 16M on the air bearing surface 40. A shape of the end surface 16M is, for example, a triangle (inverted triangle) in which a width of an end edge on the trailing side (a trailing edge TE) is larger than a width of an end edge on the leading side (a leading edge LE). In this case, a cross-sectional configuration of the magnetic pole-tip section 16A at an optional position in the length direction also has an inverted triangle shape, as with the shape of the end surface 16M, for example. Incidentally, the shape of the end surface 16M and the cross-sectional configuration of the magnetic pole-tip section 16A may be symmetric or asymmetric.

A shape of the yoke section 16B (a width WB and a thickness TB) is, for example, as follows. The width WB is constant and is wider than the width WA of the magnetic pole-tip section 16A in the length direction. Also, the width WB gradually narrows in the thickness direction. The thickness TB is constant and is equal to the maximum thickness TA of the magnetic pole-tip section 16A in the length direction. Incidentally, a cross-sectional configuration of the yoke section 16B at an optional position in the length direction may be symmetric or asymmetric.

The thin-film magnetic head operates as follows.

At the time of recording information, when a current flows to the thin-film coil 22 in the recording head section 100B, a magnetic flux for recording is generated. The magnetic flux flows inside the main magnetic-pole layer 16 from the yoke section 16B toward the magnetic pole-tip section 16A. In this case, since the inclined surface 16S is provided on the leading side of the main magnetic-pole layer 16, the magnetic flux flowing inside of the magnetic pole-tip section 16A is guided toward the trailing side as approaching the air bearing surface 40, and is eventually concentrated on the vicinity of the trailing edge TE. Since the magnetic flux is released outside and the perpendicular magnetic field is generated, the information is magnetically written on the recording medium with the perpendicular magnetic field.

When the magnetic flux is released from the magnetic pole-tip portion 16A, a part of the magnetic flux (spread component) is absorbed by the write shield layer 19. Thus, the spread of the perpendicular magnetic field is suppressed, and a gradient of the magnetic field increases. The magnetic flux absorbed by the write shield layer 19 is resupplied to the main magnetic-pole layer 16 through the return yoke layer 24.

Incidentally, the magnetic flux released from the main magnetic-pole layer 16 returns to the return yoke layer 24 through the recording medium, and is resupplied to the main magnetic-pole layer 16. This allows the magnetic flux to circulate between the recording head section 100B and the recording medium, whereby a magnetic circuit is established.

Meanwhile, at the time of reproducing the information, when a sense current flows in the MR element 8 in the reading head section 100A, a resistance of the MR element 8 changes in response to a reading signal magnetic field in the recording medium. Since this resistance change is detected as a voltage change, the information recorded in the recording medium is magnetically reproduced.

Figure 10:
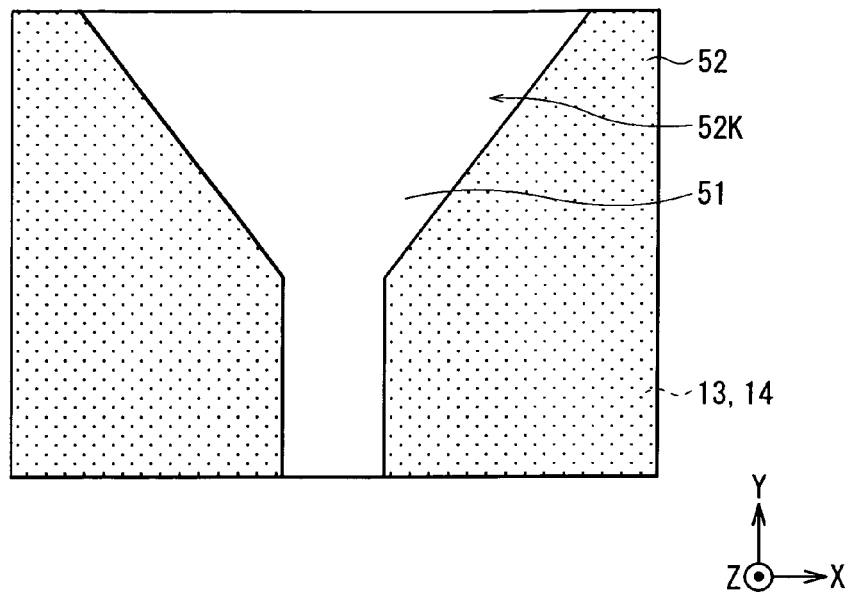
FIG. 10 is a plan view illustrating a configuration corresponding to FIG. 4A, FIG. 4B, and FIG. 4C.
Figure 11:
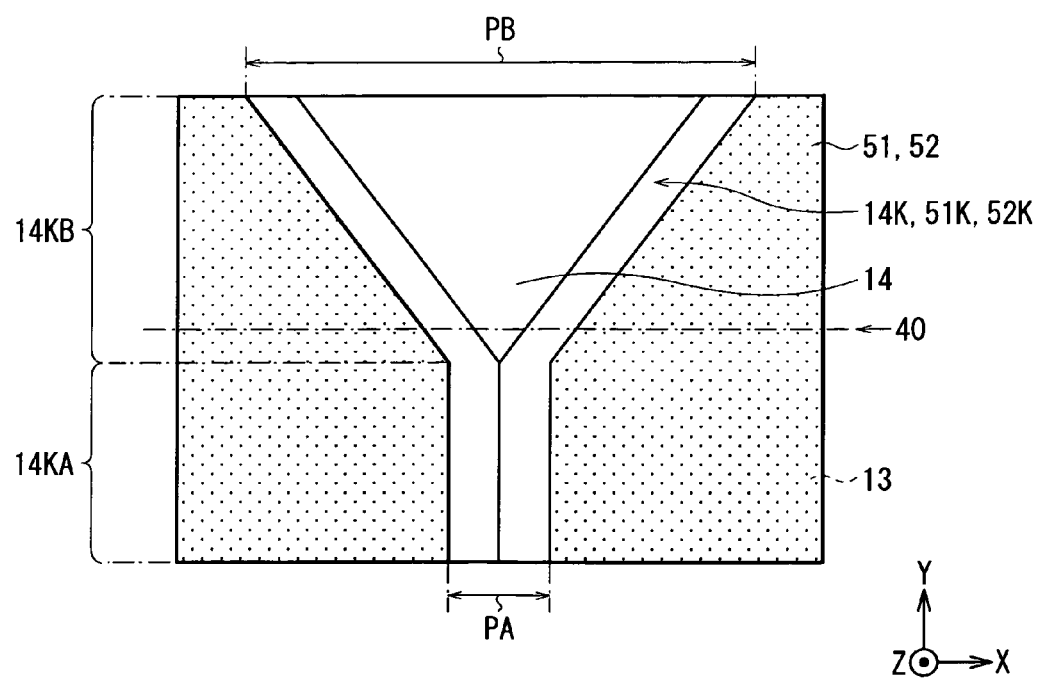
FIG. 11 is a plan view illustrating a configuration corresponding to FIG. 6A, FIG. 6B, and FIG. 6C.
Figure 12:
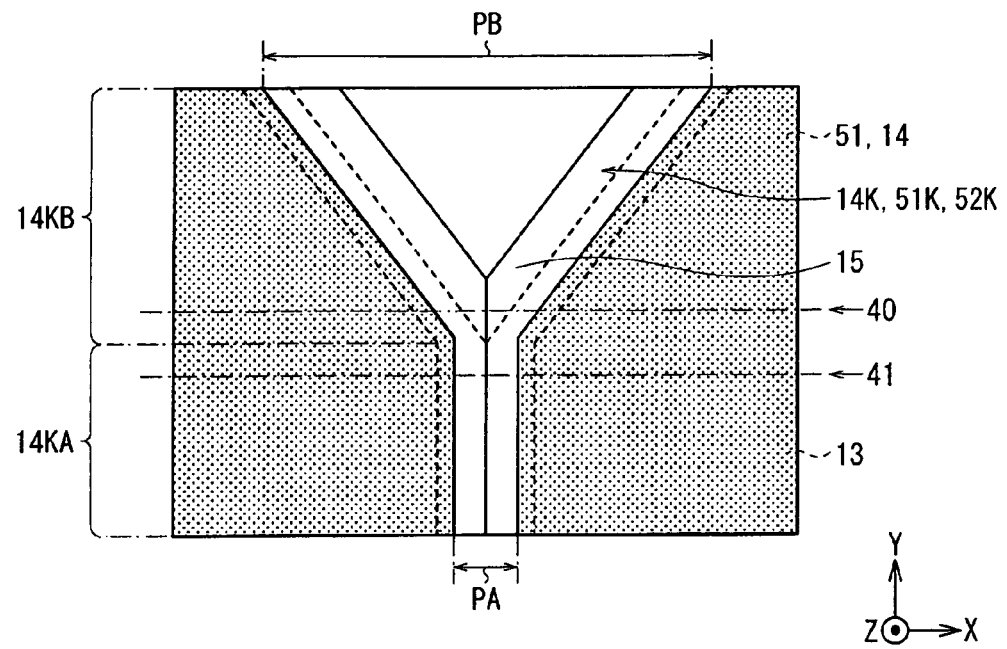
FIG. 12 is a plan view illustrating a configuration corresponding to FIG. 7A, FIG. 7B, and FIG. 7C.

Next, a manufacturing method of a main part of the thin-film magnetic head will be described. Incidentally, since the forming material, dimension, shape, and the like of a series of elements have been already described in detail, description thereof will be omitted as needed. FIGS. 4A, 4B, and 4C to FIGS. 9A, 9B, and 9C illustrate cross-sectional configurations corresponding to FIGS. 3A, 3B, and 3C, respectively. FIGS. 10 to 12 each illustrate a planar configuration corresponding to the main part in FIGS. 4A, 4B, and 4C to FIGS. 9A, 9B, and 9.

When manufacturing the thin-film magnetic head, mainly, the series of elements are sequentially formed and stacked using an existing thin-film process. The existing thin-film process means, for example, a film formation technique such as a vapor deposition method and a plating method, a patterning technique such as a photolithography method, an etching technique such as a dry etching method and a wet etching method, and a cutting technique such as a polishing method. However, techniques other than the above may be used. Incidentally, since forming materials and forming methods described hereinbelow are illustrative only, they are appropriately modifiable.

When forming the main magnetic-pole layer 16, the vapor deposition method such as a sputtering method is used to first form and stack the nonmagnetic layer 13, the nonmagnetic layer 14, and a mask layer 51 in this order, as illustrated in FIGS. 4A, 4B, 4C, and 10. As a forming material of the mask layer 51, a metal-based material such as a nickel-chromium alloy (NiCr), Permalloy, nickel (Ni), and ruthenium (Ru) is used, for example. Alternatively, an inorganic material such as silicon dioxide ($SiO_2$) and silicon nitride (SiN) may be used, for example. Then, a photoresist pattern 52 having an opening 52K is formed on the mask layer 51. The opening 52K has a shape corresponding to a planar shape of the main magnetic-pole layer 16. When forming the photoresist pattern 52, a photoresist is applied on a surface of the mask layer 51 to form a photoresist film, and the photoresist film is thereafter patterned with the photolithography method or the like, for example.

Figure 5A:
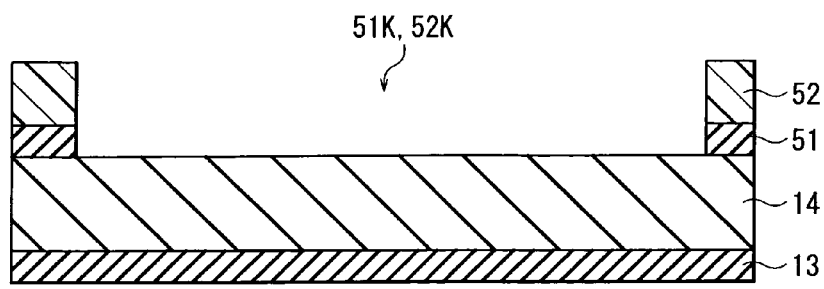
FIG. 5A, FIG. 5B, and FIG. 5C are cross-sectional views for describing a process subsequent to that of FIG. 4A, FIG. 4B, and FIG. 4C.
Figure 5B:
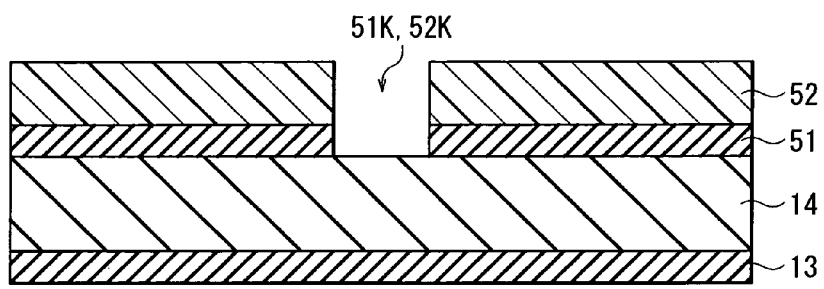
Figure 5C:
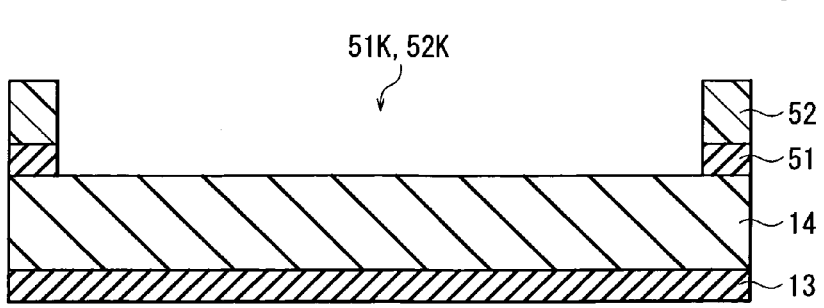

Then, the photoresist pattern 52 is utilized as a mask to etch the mask layer 51 with an ion-milling method or the like, so as to form an opening 51K as illustrated in FIGS. 5A, 5B, and 5C.

Then, the mask layer 51 formed with the opening 51K is utilized to etch the nonmagnetic layer 14 with a reactive-ion etching (RIE: reactive ion etching), so as to form a recessed section 14K as illustrated in FIGS. 6A, 6B, 6C, and 11. The recessed section 14K has a recessed section 14KA (a first recessed section) and a recessed section 14KB (a second recessed section) coupled with a rear part thereof. Incidentally, a line 40 illustrated in FIGS. 6A and 11 indicates a position which eventually becomes the air bearing surface 40, and the same applies to the description hereinbelow.

In the above etching process of the nonmagnetic layer 14, an etched material (the etched nonmagnetic layer 14) is deposited (reattached) as the etching process progresses. Thus, an etching surface (an inner wall surface of the nonmagnetic layer 14 in the recessed section 14K) inclines relative to a surface of the nonmagnetic layer 13. Accordingly, a width PA of the recessed section KA becomes constant in the length direction, and becomes gradually narrower in a depth direction (Z-axis direction: a direction going from the trailing side to the leading side). Also, a width PB of the recessed section KB becomes gradually wider with increasing distance from the recessed section 14KA in the length direction, and becomes gradually narrower in the depth direction.

Here, a depth DA of the recessed section 14KA and a depth DB of the recessed section 14KB are made to be equal to each other, for example. Also, a cross-sectional configuration of the recessed section 14KA is made to have an inverted-triangular shape, and a cross-sectional configuration of the recessed section 14KB is made to have an inverted-trapezoidal shape, for example. However, as will be described later, the depth DA and the depth DB may be different from each other, and the cross-sectional configuration of the recessed sections 14KA and 14KB may have other shape, as long as the main magnetic-pole layer 16 having the shape illustrated in FIGS. 1 and 2 is formed.

Then, the resist pattern 52 is removed with an ashing method or the like. Thereafter, the additional nonmagnetic layer 15 is so formed as to cover at least an inner surface of the recessed section 14K with the vapor deposition method such as a chemical vapor deposition method (CVD: chemical vapor deposition) or the like, as illustrated in FIGS. 7A, 7B, 7C, and 12. In this case, an exposed surface (bottom surface) of the nonmagnetic layer 13 and the inner wall surface of the nonmagnetic layer 14 in the recess 14K are made to be covered by the additional nonmagnetic layer 15.

In the above forming process of the additional nonmagnetic layer 15, there is a tendency, in the recessed sections 14KA and 14KB, that more additional nonmagnetic layer 15 is likely to be deposited on the bottom surface than the inner wall surface, and that more additional nonmagnetic layer 15 is likely to be deposited on the recessed section 14KA, which is smaller in capacity, than the recessed section 14KB which is larger in capacity. Thereby, in the recessed section 14K following the formation of the additional nonmagnetic layer 15, the depth becomes shallower in a front part (on the recessed section 14KA side) than a rear part (on the recessed section 14KB side), and the depth becomes gradually shallower as approaching the front part from the rear part in a halfway part thereof. Here, in the recessed sections 14KA and 14KB, the depth DA becomes shallower than the depth DB, and the depth DB becomes gradually shallower as approaching the recessed section 14KA on a side close thereto, for example. Thus, an inclined surface 15S is formed on the additional nonmagnetic layer 15 in a region in which the depth DB becomes gradually shallower.

Then, a magnetic layer 53 is formed at least in the recessed section 14K formed with the additional nonmagnetic layer 15, with the plating method such as an electrolytic plating method or the like, or with the vapor deposition method such as the sputtering method or the like. When using the electrolytic plating method, a seed layer (not illustrated) is formed with the vapor deposition method such as the sputtering method or the like, and thereafter, the seed layer is utilized as an electrode to grow a plating film, for example. A forming material of the seed layer may be a material same as or different from that of the plating film, as long as the formation material is an electrically-conductive material.

Then, at least the magnetic layer 53 is polished with a chemical mechanical polishing (CMP: chemical mechanical polishing) method or the like until the nonmagnetic layer 14 is exposed, as illustrated in FIGS. 9A, 9B, and 9C. Thereby, the inclined surface 16S is so formed in the magnetic layer 53 as to be adjacent to the inclined surface 15S. In this case, the polishing may be performed excessively as needed.

Finally, at least the magnetic layer 53 is cut until the line 40 (in a halfway part of the inclined surface 16S) with the CMP method, the etching method or the like, to form the air bearing surface 40. Thereby, the main magnetic-pole layer 16 having the shape illustrated in FIGS. 1 and 2 is completed.

According to the manufacturing method of the thin-film magnetic head, the nonmagnetic layer 14 having the recessed section 14K (the recessed sections 14KA and 14 KB) is formed, and then the additional nonmagnetic layer 15 is formed on the inner surface of the recessed section 14K, as described above. Thereafter, the magnetic layer 53 is formed in the recessed section 14K formed with the additional nonmagnetic layer 15, and then the magnetic layer 53 is cut to form the air bearing surface 40, as described above.

Thus, the depth of the recessed section 14K becomes shallower in the front part (recessed section 14KA side) than the rear part (recessed section 14 KB side), and the depth becomes gradually shallower as approaching the front part from the rear part in the halfway part thereof, by utilizing a difference in the deposition tendency of the additional nonmagnetic layer 15 between the recessed section 14KA and the recessed section 14KB. Accordingly, the magnetic pole-tip section 16A of the main magnetic-pole layer 16 is so formed that the width WA gradually widens in the length direction and gradually narrows in the depth direction, and that the thickness TA gradually increases in the thickness direction, in the length direction. Further, since only the deposition process of the magnetic layer 53 is substantially sufficient to form the main magnetic-pole layer 16 having the shape described above, there is no need to perform post-processing or dividedly form the main magnetic-pole layer 16. Also, since the shape of the main magnetic-pole layer 16 is determined by precision of formation (deposition) of the additional nonmagnetic layer 15, it is more accurately controlled than a case in which it is determined by precision of the post-processing (working accuracy of the etching).

Therefore, since the shape of the main magnetic-pole layer 16 is determined, reflecting a change in the depth of the recessed sections 14KA and 14KB in accordance with the difference in the deposition tendency in the additional nonmagnetic layer 15, it is possible to form the main magnetic-pole layer having the shape suitable for concentrating the magnetic flux (the tapered section in the thickness direction), easily and accurately.

Figure 13:
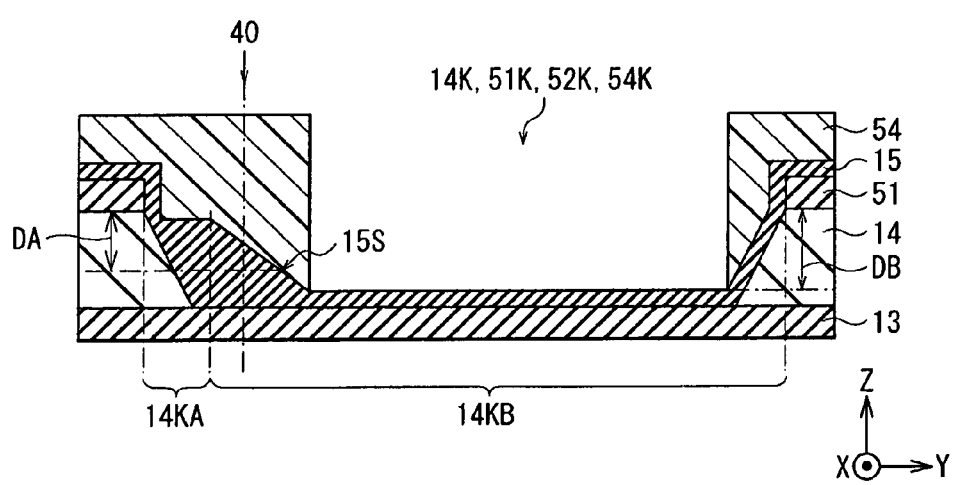
FIG. 13 is a cross-sectional view for describing a modification regarding the manufacturing method of the main part of the thin-film magnetic head.
Figure 14:
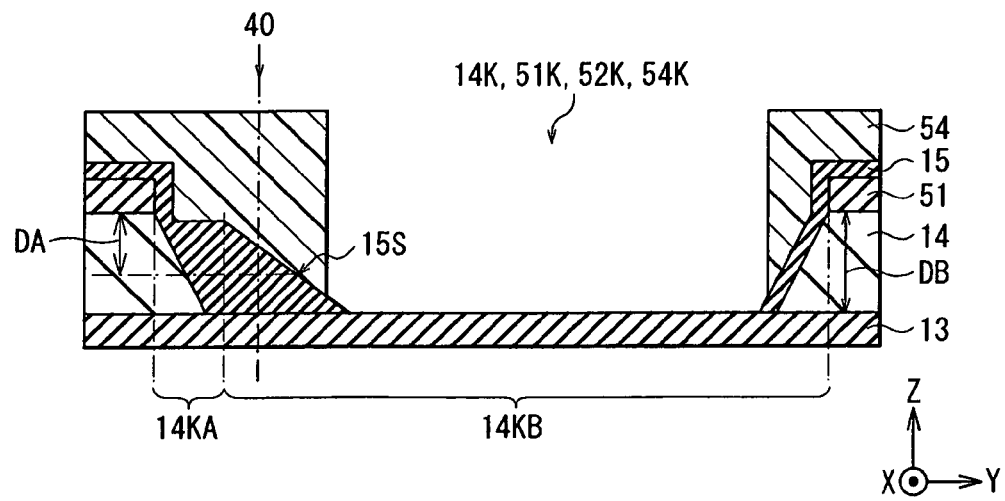
FIG. 14 is a cross-sectional view for describing a process subsequent to that of FIG. 13.
Figure 15:
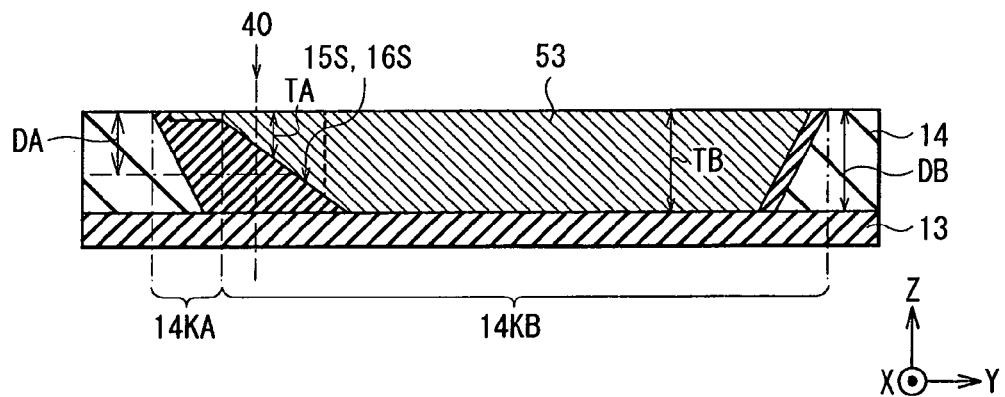
FIG. 15 is a cross-sectional view for describing a process subsequent to that of FIG. 14.

Incidentally, when forming the main magnetic-pole layer 16, the additional nonmagnetic layer 15 may be processed additionally to expand the inclined surface 15S as illustrated in FIGS. 13 to 15 corresponding to FIG. 7A, for example. In detail, after the additional nonmagnetic layer 15 is formed, a photoresist pattern 54 having an opening 54K is formed, as illustrated in FIG. 13. In this case, the photoresist pattern 54 is so brought into alignment that a position of an inner wall surface of the opening 54K coincides with a position of a rear end of the inclined surface 15S. Then, the photoresist pattern 54 is utilized as a mask to partially etch the additional nonmagnetic layer 15 with the ion-milling method or the like, so as to expand the region, in which the depth of the recessed section 14 becomes gradually shallower, toward a rear part, as illustrated in FIG. 14. Thereby, the inclined surface 15S is extended toward the rear part. Then, the resist pattern 54 is removed with the ashing method or the like, and thereafter the magnetic layer 53 is formed in the recessed section 14K formed with the additional nonmagnetic layer 15, as illustrated in FIG. 15. In this case, the inclined surface 16S of the main magnetic-pole layer 16 is extended toward the rear part by an amount corresponding to an amount of the extension of the inclined surface 15S. Thus, it is possible to increase the thickness TB of the yoke section 16B (magnetic flux capacity).

Figure 16:
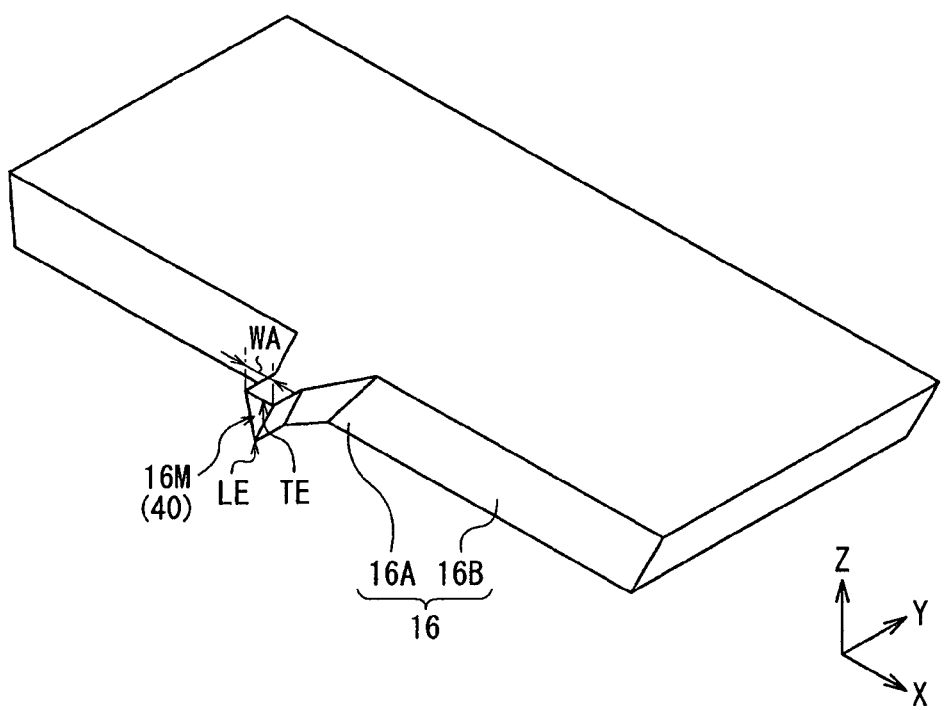
FIG. 16 is a perspective view illustrating a modification regarding the configuration of the main magnetic-pole layer illustrated in FIG. 2.

Also, after the magnetic layer 53 is formed, the magnetic layer 53 may be cut until a line 41 instead of the line 40 illustrated in FIG. 12 to form the air bearing surface 40, for example. In this case, the magnetic pole-tip section 16A is so formed to further include a tip section whose width WA is constant in the length direction, as illustrated in FIG. 16 corresponding to FIG. 2. Even in this case, it is possible to achieve effects similar to those of the case illustrated in FIG. 2.

Also, the frame mold (frame) for forming the main magnetic-pole layer 16 may be integrally formed without dividedly form the same (i.e., without separately forming the nonmagnetic layer 13 and the nonmagnetic layer 14), for example. In this case, a single nonmagnetic layer may be formed instead of the nonmagnetic layers 13 and 14, and thereafter, the mask layer 51 and the photoresist pattern 52 may be used to etch and dug down the nonmagnetic layer until a halfway part thereof, so as to form the recessed section 14K.

Also, the shape of the end surface 16M of the magnetic pole-tip section 16A is not necessarily limited to the inverted triangle, and may be an inverted trapezoid, for example. To form the magnetic pole-tip section 16A having such an end surface 16M, an etching amount or the like may be so adjusted, when forming the recessed section 14KA (FIG. 6B), that a cross-sectional configuration of the recessed section 14KA has the inverted trapezoidal shape, for example.

Also, when forming the recessed section 14KA (FIG. 6B), the amount of etching or the like may be adjusted to allow the inner wall surface of the nonmagnetic layer 14 in the recessed section 14KA to have a curved surface, or to have multiple surfaces which are bent at one or two or more points, instead of the flat surface, for example. This also applies to the inner wall surface of the nonmagnetic layer 14 in the recessed section 14KB.

Also, the width WB of the yoke section 16B does not necessarily have to be constant, and may become gradually wider in the length direction, for example. In this case, a spread angle of the yoke section 16B (an angle between a side surface and the Y-axis) may be the same as or different from a spread angle of the magnetic pole-tip section 16A.

Although the present invention has been described hereinbefore with reference to the embodiment, the present invention is not limited to the above-described embodiment, and various modifications may be made. For example, the method of manufacturing the perpendicular magnetic recording head according to the present invention may be applied to a recording-dedicated head not equipped with a recording head section.

What is claimed is:

1. A method of manufacturing a perpendicular magnetic recording head, the method comprising;
   forming a nonmagnetic layer having a first recessed section and a second recessed section coupled with a rear part of the first recessed section, the first recessed section including a width which is constant in a le direction and a width which becomes gradually narrower in a depth direction and the second recessed section including a width which becomes gradually wider in the length direction and a width which becomes gradually narrower in the depth direction, the length direction being a direction going rearward from an air bearing surface, and the depth direction being a direction going toward a leading side from a trailing side;
   forming an additional nonmagnetic layer on an inner surface of the first and the second recessed sections;
   forming a magnetic layer in the first and the second recessed sections which are formed with the additional nonmagnetic layer; and
   forming a main magnetic-pole layer by cutting the magnetic layer and thereby forming the air bearing surface,
   wherein, in the first and the second recessed sections which are formed with the additional nonmagnetic layer, a depth of the first recessed section is made shallower than a depth of the second recessed section, and the depth of the second recessed section is made gradually shallower as approaching the first recessed section on a side close to the first recessed section.

2. The method of manufacturing the perpendicular magnetic recording head according to claim 1, wherein, after forming the additional nonmagnetic layer and before forming the magnetic layer, the additional nonmagnetic layer is partially removed to expand a region in which the depth of the second recessed section becomes gradually shallower.

3. A method of manufacturing a perpendicular magnetic write head, the method comprising:

forming a nonmagnetic layer having a first recessed section and a second recessed section coupled with a rear part of the first recessed section, the first recessed section having a width which is uniform along a length direction and becomes gradually narrower along a depth direction, and the second recessed section having a width which becomes gradually wider along the length direction and becomes gradually narrower along the depth direction, the length direction representing a direction going rearward from an air bearing surface, and the depth direction representing a direction going toward a leading side from a trailing side;

forming an additional nonmagnetic layer on an inner surface of the first and the second recessed sections, so that a depth of the first recessed section becomes shallower than a depth of the second recessed section;

forming a magnetic layer in the first and the second recessed sections which are covered with the additional nonmagnetic layer; and cutting the magnetic layer to form the air bearing surface and complete a main magnetic-pole layer.

4. The method of manufacturing the perpendicular magnetic write head according to claim 3, wherein, in the first and the second recessed sections which are covered with the additional nonmagnetic layer, the depth of the second recessed section in a region close to the first recessed section becomes gradually shallower approaching the first recessed section.

5. The method of manufacturing the perpendicular magnetic write head according to claim 3, wherein, after forming the additional nonmagnetic layer and before forming the magnetic layer, the additional nonmagnetic layer is partially removed to expand the region in which the depth of the second recessed section becomes gradually shallower.

* * * * *